United States Patent [19]

Lafuze

[11] 3,937,974

[45] Feb. 10, 1976

[54] STARTER-GENERATOR UTILIZING PHASE CONTROLLED RECTIFIERS TO DRIVE A DYNAMOELECTRIC MACHINE AS A BRUSHLESS DC MOTOR IN THE STARTING MODE WITH STARTER POSITION SENSE VARIATION WITH SPEED

[75] Inventor: David Logan Lafuze, Erie, Pa.

[73] Assignee: General Electric Company, Wilmington, Mass.

[22] Filed: Aug. 30, 1974

[21] Appl. No.: 502,027

[52] U.S. Cl. ................ 290/46; 290/38 R; 60/39.14; 318/138

[51] Int. Cl.$^2$ F02N 11/04; H02K 23/52; H02P 9/04

[58] Field of Search ...... 318/227, 138, 136; 290/10, 290/19, 31, 46, 37, 38; 60/39.14

[56] References Cited

UNITED STATES PATENTS

| | | | |
|---|---|---|---|
| 3,264,482 | 8/1966 | Clark et al. | 290/52 X |
| 3,696,278 | 10/1972 | Kuniyoshi | 318/227 |
| 3,781,615 | 12/1973 | Mokvytzki | 318/227 |
| 3,784,888 | 1/1974 | Geiersbach | 310/227 |
| 3,786,327 | 1/1974 | Dyer | 318/227 |

*Primary Examiner*—Robert K. Schaefer
*Assistant Examiner*—John W. Redman

[57] ABSTRACT

The instant invention describes an improvement in a starter-generator arrangement in which a dynamoelectric machine is driven as a brushless DC motor to start a dynamic load such as a jet engine and as a cynchronous constant frequency generator after the jet engine is ignited and brought up to speed. A plurality of cycloconverters utilizing phase controlled rectifier banks are operated from a constant frequency supply source to supply current to the armature windings of the machine in the starting mode. Position sensing elements such as Hall generators sense the rotor position relative to the machine windings and generate enabling signals to control conduction of the phase controlled rectifiers to supply current to the proper armature windings so that the machine functions essentially as a DC brushless motor to drive a dynamic load such as a jet engine. The Hall sensors are so positioned that the enabling signals are generated so that stator current conduction in one winding may be terminated and current conduction switched to the next winding in such a fashion that commutation of the conducting SCR's by the machine counter EMF is made possible at high speeds while permitting maximum torque at standstill and low speeds. The stator current conduction angle with respect to the rotor position is varied as a function of speed. By varying the position sense advance and hence, the phase angle between the armature current and the machine voltage, maximum torque may be produced at the low speeds and maximum current may be commutated at the speeds where the machine voltage must be utilized to commutate the SCR's to transfer current flow from one winding to the other. The cranking time of an engine is thus substantially reduced since at low speeds, maximum torque is developed from the machine.

4 Claims, 16 Drawing Figures

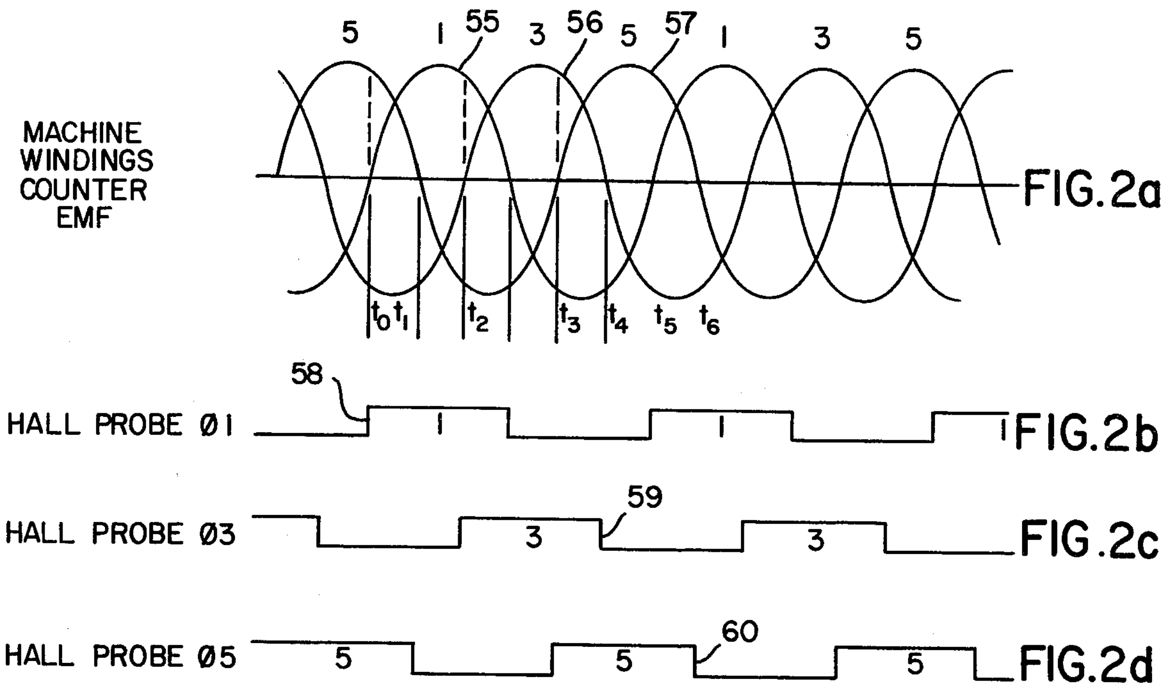
FIG.2a
FIG.2b
FIG.2c
FIG.2d
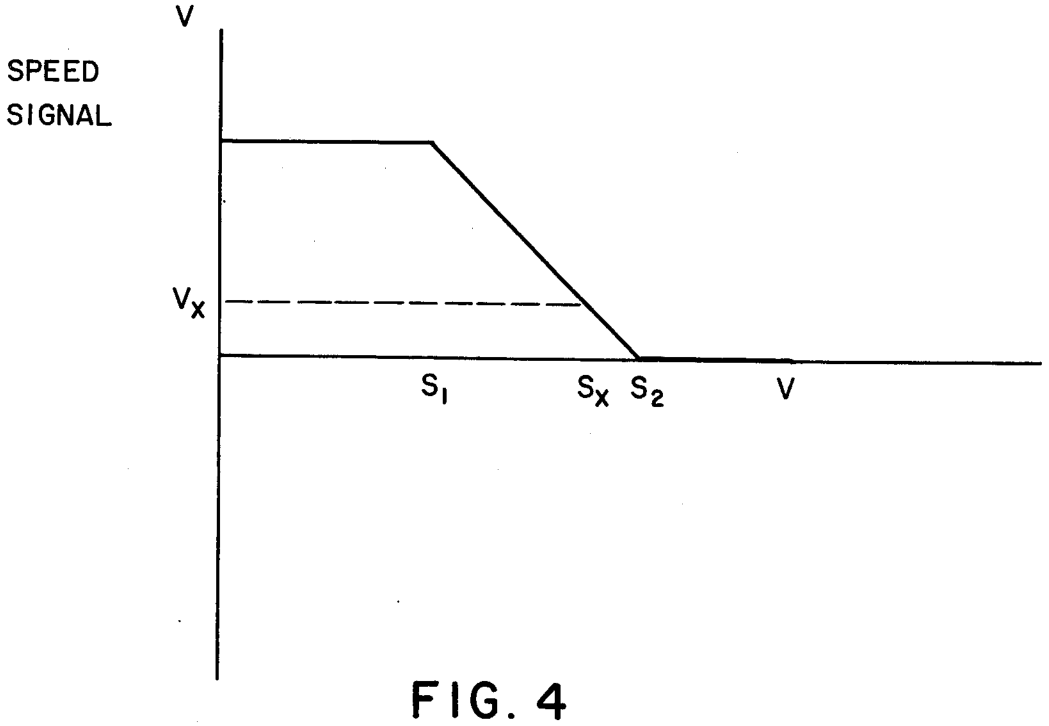
FIG. 4

MACHINE COUNTER E.M.F.
HALL PROBE VOLTAGE AT INVERTING INPUT OF OP. AMP. 64
HALL PROBE VOLTAGE AT NON-INVERTING INPUT OF OP. AMP. 64
OP. AMP. 64 OUTPUT
HALL PROBE AND SPEED VOLTAGES AT NON-INVERTING INPUT OF OP. AMP. 64
HALL PROBE AND SPEED VOLTAGES AT INVERTING INPUT OF OP. AMP. 64
OP. AMP. OUTPUT
NAND GATE 94 OUTPUT (3P+6N)
CURRENT FLOW IN PHASE 1 WINDING W1
55
56
57
105
106
107
108
111
112
ØA
ØB

STARTER-GENERATOR UTILIZING PHASE CONTROLLED RECTIFIERS TO DRIVE A DYNAMOELECTRIC MACHINE AS A BRUSHLESS DC MOTOR IN THE STARTING MODE WITH STARTER POSITION SENSE VARIATION WITH SPEED

The instant invention relates to a system for controlling a dynamoelectric machine to operate the machine as a DC brushless motor in one operating mode and as a generator system with constant frequency output in another mode. More particularly, the invention relates to a system in which cycloconverter control circuits are operated in such a manner as to drive the dynamoelectric machine as a brushless motor in one mode and to provide frequency conversion of a variable frequency voltage from the machine during the generator mode. Furthermore, circuitry is provided which adjusts the phase angle between the armature current, the flux, and the machine counter EMF to provide maximum torque at low speeds while permitting maximum current commutation by the machine counter EMF at speeds where the machine frequency is equal to or greater than half the supply frequency.

In an application for U.S. letters Patent, Ser. No. 440,322, filed Feb. 7, 1974 in the name of David Lafuze and entitled "Starter Generator Electrical System Utilizing Phase Controlled Rectifiers to Drive a Dynamoelectric Machine as a Brushless DC Motor in the Starter Mode and to Provide Frequency Conversion for a constant Frequency AC Output in the Generating Mode," and assigned to the General Electric Company, the assignee of the present application, a starter-generator system is described in which a plurality of cycloconverter SCR banks are provided to supply current to the proper armature windings of a synchronous dynamoelectric machine so that the machine functions essentially as a DC brushless motor to start a jet engine. When the engine comes up to speed, the system is converted to the generating mode and the phase controlled rectifier banks are operated from the synchronous generator output voltage to produce a constant frequency 400 Hz output from the varying frequency output of the generator. While the system is operating in the starter mode as a brushless DC motor, the rectifier banks associated with each of the supply voltage phases are selectively driven into conduction and phase controlled to provide current flow of the proper magnitude into and out of the armature windings of the machine as a function of the supply voltage phase and the rotor position. Thus, suitable logic circuitry associated with the rotor position sensors determines which of the phase controlled rectifiers in the various banks is to be triggered to supply current to the winding where the field flux density is high. As current flow is switched from one set of windings to another, one set of SCR's must be commutated off and another set of SCR's associated with the winding to which current is to be switched, must be driven into conduction.

To obtain maximum torque from the machine (which is proportional to the flux density, the armature current and the cosine of the angle between them), it is desirable to maintain conduction in the winding as long as possible, i.e., virtually up to the point when the current in that winding reverses phase before commutating the conducting SCR's and switching current flow to the next armature winding. However, since SCR's are devices which need a finite number of volt-seconds to be driven from the conducting state, it is necessary to initiate the commutation process some point prior to the time that the current reverses phase, i.e., provides the commutation phase angle. On the other hand, the advance should not be more than necessary because the torque produced is proportional to the cosine of the angle of advance so that excessive advance reduces the amount of torque available. At low speeds, the frequency of the counter EMF induced in the armature winding is low compared to the supply frequency. Consequently, the phase angle can be very small to maximize torque since commutation of the conducting SCR's and transfer of current to the next winding can be accomplished by the supply voltage. That is, when the frequency of the supply voltage is high compared to that of the machine voltage there is a phase reversal of the supply voltage every few degrees of the machine voltage. Hence, every few degrees reversal of the supply voltage polarity reverses the anode to cathode voltage of the conducting SCR and thereby commutating one SCR off while another SCR is triggered into conduction to supply current to the next phase winding. However, as the machine speed increases and the machine voltage frequency approaches the supply frequency, it becomes more difficult to commutate the SCR's with the supply voltage. For example, when the machine speed is such that the machine counter EMF frequency is one-half the supply frequency, there is a phase reversal of the supply voltage only every 90° of the machine frequency which makes its commutation by the supply voltage very unreliable. Thus, as the machine frequency approaches the frequency of the supply voltage, there is no assurance that there will be a suitable phase reversal of the supply voltage to commutate the SCR's. Consequently, the machine voltage must be used to commutate the conducting SCR's. The amount of current that can be so commutated is proportional to the amount of phase advance. As a result, the phase advance with respect to the machine voltage must be sufficiently great to commutate the current at these high speeds.

In the system described in the aforesaid Lafuze application, the rotor position sensing Hall elements which drive the logic network that produce the enabling signals for one set of SCR's and commutates the conducting SCR's, are positioned so as to establish a fixed angle of advance. This angle of advance is adequate to commutate the maximum expected current by the machine counter EMF. That is, the position of the Hall sensor and the point at which commutation is initiated is fixed and represents the worst case condition. However, a fixed phase advance that is adequate to commutate the maximum current at higher speeds reduces the torque more than necessary at low speed where the commutation is by the supply voltage. This, of course, increases the angle between the armature current, and the flux and the machine voltage much more than necessary reducing the torque the machine is capable of producing. This, of course, represents an inefficient condition which results in reduced torques at the lower speeds and hence, a longer period of time is ncessary to crank the engine and bring it up to speed.

It is therefore one of the objectives of the instant invention to provide a starter-generator system utilizing a common dynamoelectric machine and common cycloconverter control circuitry for controlling distribution of current to the dynamoelectric machine during motoring in which the angle of advance for commutating the SCR's is optimized.

Applicant has found that an improvement in the efficiency and the torque output of the machine can be achieved by varying the phase advance for commutation of the SCR's as a function of the machine speed. Thus, at low speeds when commutations of the SCR is possible by the supply voltage, the phase advance produced by the signals from the rotor position logic is very small producing maximum torque from the machine. As the machine speed reaches a value at which the frequency of the machine counter EMF is equal to or greater than one-half of the supply frequency so that the machine voltage must commutate the SCR's, the angle of advance is increased in order to provide sufficient volt seconds to commutate the SCR current. Thus, over a given critical speed range which, for example, may be the range over which the machine frequency varies from one-half of the supply frequency to the supply frequency, the phase angle is continually increased until it is a maximum value to permit commutation of the maximum expected current by the machine counter EMF. Thus, at low speeds, the phase angle of advance is maintained at a minimum value so that the cosine of the angle between the flux, the armature current and the counter EMF is at a high value and maximum torque output from the machine is possible. As the speed of the machine increases into the critical range, the angle of advance is increased to permit proper commutation of the SCR's by the machine voltage. However, it will be realized that the overall machine efficiency is thus increased since at low speed where commutation by the supply voltage maximum torque is produced by minimizing phase advance. At the same time, in the critical speed range where it becomes difficult to commutate with the supply voltage, the phase angle of advance is optimized to allow commutation of the SCR's for the given current condition by the machine voltage.

It is therefore another object of the invention to provide a starter-generator system in which a dynamoelectric machine is operated as a brushless DC machine in the motoring mode in which the angle of phase advance is controlled as a function of speed to produce maximum torque at low speed and proper commutation by the machine voltage at high speeds.

Other advantages and objectives of the instant invention will become apparent as the description thereof proceeds.

The various advantages of the instant invention are realized by providing a synchronous type of main machine which is operated as a DC brushless motor in the motoring mode and as a synchronous generator in the generating mode. The main machine in both modes, is controlled by cycloconverters having a plurality of phase controlled rectifier banks which operate as commutating or switching elements during the motoring mode. In the motoring mode, signals representative of the main machine rotor position are processed in suitable logic circuitry to generate signals which control individual rectifiers in the rectifier bank to switch current to the proper armature windings of the main machine. The main machine rotor position signals are modified as a function of the speed of the machine to minimize the position sense advance, i.e., the phase angle between the armature current and the flux at standstill and low speeds when commutation is accomplished by the supply voltage. When the machine speed increases beyond a predetermined value, preferable speed at which the machine voltage frequency is one-half the frequency of the supply voltage, the commutation of the SCR's is by the machine counter EMF. It is therefore necessary to optimize the phase angle of advance so that the armature current which can be commutated by the machine back EMF is optimized. Thus, over the critical speed range, the phase angle is progressively advanced in order to permit commutation of the current by the machine back voltage. The system operates in such a manner that at low speeds the angle of advance for the position sense is minimized thereby producing maximum torque from the machine at low speed and is progressively advanced over the critical range of speed to assure proper commutation for the current levels as the current is switched from winding to winding.

The novel features which are believed to be characteristic of this invention are set forth with particularity in the appended claims. The invention itself, however, both as to its organization and mode of operation, together with further objectives and advantages, may best be understood by reference to the following description taken in connection with the accompanying drawings in which:

FIG. 1 is a block diagram of the overall starter generator system utilizing a single dynamoelectric machine both as a motor and a generator and shows the control circuitry for achieving the switching of current to the proper windings during motoring control, controlling current levels during motoring and converting the output from the dynamoelectric machine to a constant output frequency during the generating mode.

FIG. 2 shows the generated voltages in the machine when functioning as a motor and its phase relationship to the position sensor and the position sensor output.

FIG. 4 is a wave form diagram showing the output signal from the speed control network utilized to modify the position sensor phase advance.

FIGS. *5a*-*5b* show the machine voltage, Hall output voltage, and output from the operational amplifier to illustrate the manner in which the position sensor advance is modified as a function of the machine speed.

Figure 1:
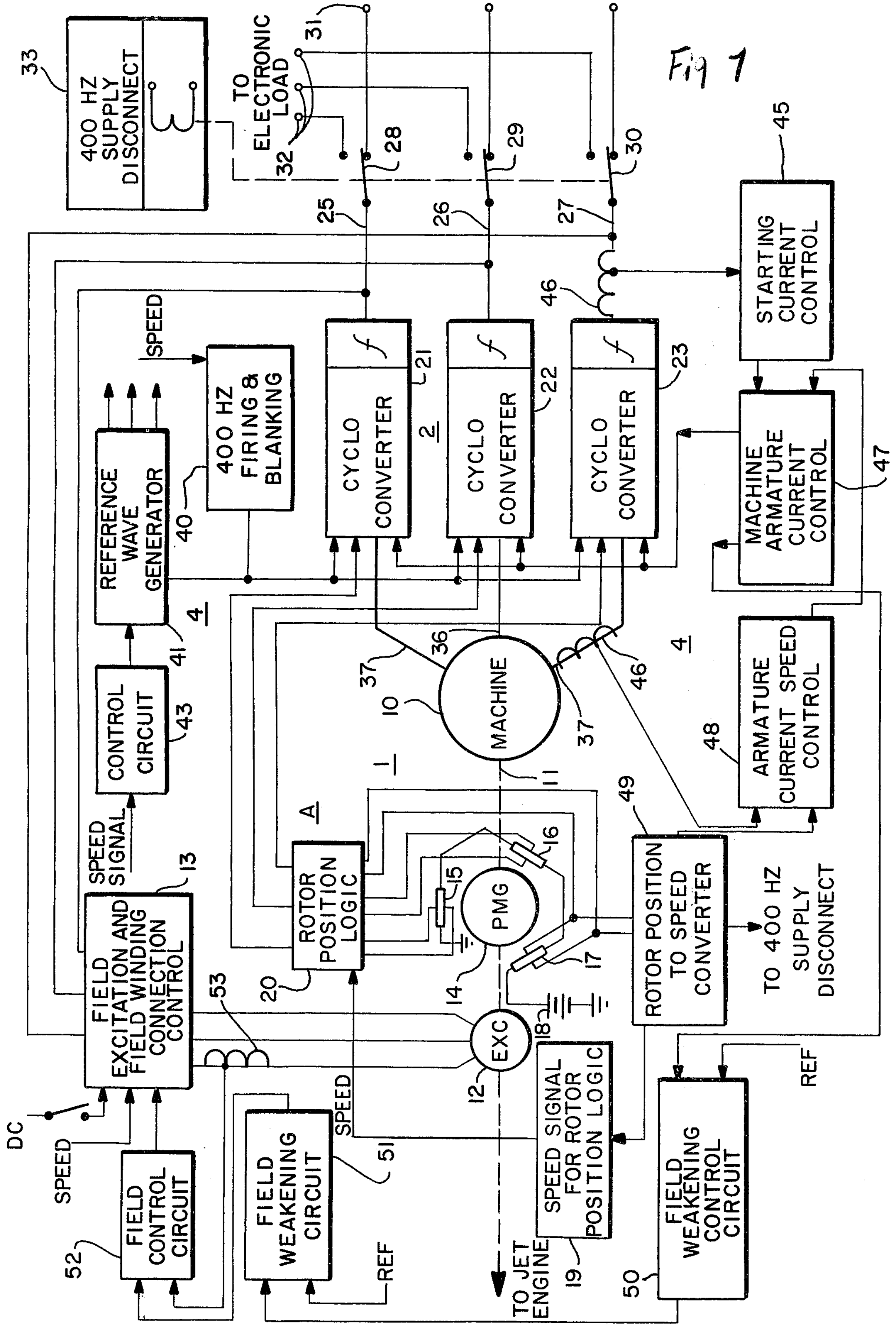

FIG. 1 is a block diagram of the overall system in which a dynamoelectric machine is utilized both as a DC brushless motor to start a dynamic load such as a jet engine and as a synchronous generator driven by the jet engine after it has ignited and been brought up to speed. The system consists of four major subsystems. The first is the main power chain shown generally at 1 which includes the dynamoelectric machine and its associated energizing elements. The cycloconverters including the phase controlled rectifier banks which selectively switch current flow to the proper windings of the main machine during the motoring mode and convert the variable frequency output from the generator to the constant frequency output generating mode are shown at 2. A current control system shown generally at 3 is provided to control the current level in the machine during motoring operation and senses both input current and machine current to control the firing angle of the rectifiers in the cycloconverters and hence the armature current levels during the motoring mode.

The current control system also includes means for weakening the field of the main machine to maintain the system in the motoring mode up to a predetermined speed. The fourth major subsystem includes the control circuits for firing the cycloconverter rectifiers in the proper sequence to switch current at the proper armature windings as a function of rotor position as well as the means to vary the phase angle as a function of machine speed.

The main power chain consists of a main machine 10 mounted on a shaft 11 and is preferably a synchronous machine having DC field windings mounted on the rotor and a six-phase armature mounted on the stator. Mounted on the same shaft as the main machine 10 is an exciter generator 12 which has armature windings on the rotor and field windings on the stator. The exciter field windings are the only elements which are modified in switching between the motoring and the generating modes. The exciter field is connected in a three-phase WYE connection and energized from an AC source through a field excitation and field winding connection control circuit 13 during the motoring mode and is connected in series and excited from a DC source to function as an insideout synchronous generator during the generating mode.

The manner in which the exciter field windings are modified in switching between the motoring and generating modes is described and claimed in a contemporaneously filed application for U.S. letters Patent entitled:

A Field Excitation System for Synchronous Machines Utilizing a Rotating Transformer/Brushless Exciter Generator Combination Ser. No. 440,516, Docket (52-AY-E174) filed, Feb. 7, 1974 in the name of Lawrence Waters Messenger and assigned to the General Electric Company, the assignee of the present application.

The voltages induced in the rotor winding of exciter 12 are rectified in a rectifier bridge, not shown, mounted on or within shaft 11 to provide DC excitation for the main machine. Also mounted on shaft 11 is a permanent magnet generator (PMG) 14 having a rotor consisting of a plurality of permanent magnet pole pairs and an armature winding mounted on the stator. The PMG provides the DC field excitation for exciter 12 during the generating mode and provides a means for determining the rotor position of the main machine during the motoring mode with the rotor position being utilized to control switching of current to the armature windings by the cycloconverter system 2. To this end, three Hall generators 15, 16 and 17 mounted in the air gap of the PMG are spaced 120 electrical degrees apart with respect to the permanent magnet pole pairs and in magnetic flux sensing relationship to the rotor permanent magnets. The Hall generators are energized by applying a voltage from a DC source 18 across one pair of faces of the Hall material. A voltage is generated across the Hall element which is proportional to the magnetic flux density applied to the Hall element. Thus, as rotor of PMG 14 rotates, the voltage across the respective Hall generators varies from 0 to a maximum as a function of the flux density thereby generating three varying trapezoidal voltages spaced 120 electrical degrees apart. The output from the Hall sensors are thus representative of the position of the PMG rotor. If the rotor of the PMG is constructed to have the same number of pole pairs as the main machine and the poles on the PMG are aligned with the poles of the main machine, the main machine rotor position is known if the PMG position is known. Thus, the output signals from the Hall elements 15–17 may be used to control switching of the gated elements in the cycloconverters to switch current to the proper winding in the armature of the main machine.

To this end, the three output signals from the Hall sensors are applied to a Rotor Position Logic Network shown generally at 20 which converts the varying Hall voltages to six enabling signals of 120° duration to control the conduction interval of the six rectifiers in each bank. These rotor position logic signals are applied over suitable leads to the individual cycloconverters forming part of the cycloconverter assembly 2.

The Rotor Position Logic Network is also controlled in response to a signal proportional to the speed of the machine to vary the conduction period with respect to rotor position as a function of speed. The duration of the enabling signals for the SCR's which are produced by the Rotor Position Logic Network 20 is varied as a function of machine speed. Thus, over a critical range of machine speeds (preferably at speeds where the machine frequency varies from half the supply frequency up to the supply frequency), i.e., the range where commutation of the SCR's is transferred from commutation by the supply voltage to commutation by the machine voltage (counter EMF), the rotor position sense is varied to permit proper commutation of the armature current by the machine voltage. To this end, the output voltages from Hall probes 14–16 are processed in a Rotor Position to Speed Converter Network 49 to produce a signal proportional to speed. That is, by differentiating the rotor position signals from the Hall probes, a signal proportional to rotor speed is produced and is applied to a Speed Signal for Rotor Position Logic Network 19. Network 19 may, for example, include circuitry for producing a variable width pulse which is proportional to speed. The output from Network 19 is applied to Rotor Position Logic Network 20 to vary the duration of the enabling signal and thereby control the phase angle between armature current, flux and machine voltage. It will be apparent to those skilled in the art that the invention is not limited to an arrangement in which a variable width pulse is provided as the speed signal for the Rotor Position Logic Network. Any suitable DC signal which is proportional to speed may be utilized. In fact, the output from Network 49 may be applied directly to Rotor Position Logic Network 20 and Network 19 eliminated completely.

Cycloconverter assembly 2 consists of three cycloconverters 21, 22 and 23 along with the associated output filters which are connected through leads 25, 26 and 27 and a speed controlled switch, shown for the sake of simplicity as three single pole double throw switches 28, 29 and 30, alternatively to a source of 400 Hz supply voltage at the terminals 31 or to an electrical output load connected to the terminals 32. The single pole double switches are controlled by a Supply Disconnect Network 33 which positions the single pole double throw switches to connect the cycloconverters to the source 400 Hz supply voltage when the system is in the start mode. When the main machine 10 has brought the jet engine up to idling speed, Supply Disconnect Network 33 repositions the single pole double throw switches to disconnect the constant frequency supply source from the converters and to couple the output of the cycloconverters to the electrical load which receives the constant frequency output signal during the generating mode.

Each cycloconverter 21–23 consists of two banks of oppositely poled silicon controlled rectifiers (SCR's) which are selectively gated to control their conduction interval. Each bank consists of six rectifiers, one SCR for each of windings of the six-phase armature. Oppositely poled rectifier banks are provided for each supply phase to allow flow of current into and out of the respective windings, i.e., negative and positive current, during the motoring mode and to provide current during rectification and inverting mode of the machine when operating in a generating mode.

One input to the cycloconverters is from the main machine armature windings over leads 35–37. This input is shown as a three-phase lead from the machine. In actuality, for a six-phase machine, each of the outputs is a pair of windings from the corresponding pair of armature windings in the machine since the voltages in complementary pairs of windings of a six-phase machine are 180° out of phase. Thus, phase 1 and phase 4 of a six-phase machine are 180° out of phase so that at any given time the corresponding rectifiers in a positive and negative bank of the converter will be conducting at the same time to permit current flow into one winding of the pair and out of the other winding of the same pair.

The cycloconverters are also supplied with the output from the Rotor Position Logic Network to determine which of the SCR's in any given bank is to be fired and which of the armature windings is to be supplied with the current. Simultaneously, each of the cycloconverters is supplied with a firing and blanking wave from the firing and blanking wave circuit 40 to ensure that firing or triggering pulses are supplied to the SCR's at any given bank only when the polarity of voltage across that SCR in a given bank is proper. To this end, firing and blanking wave network 40 is supplied by the 400 Hz supply voltage and generates suitable blanking waves for each of the cycloconverters depending on the phase of the supply voltage. Firing and blanking network 40 is operative to provide the firing and blanking signals only during the motoring mode of the machine. Whenever the system switches to the generating mode, firing and blanking network 40 is disabled in response to a speed control signal impressed on an associated disable terminal. Reference wave generator 41 which is normally disabled by control circuit 43 during the motoring mode is then coupled to the cycloconverters and supplies a reference wave signal. The signal from reference wave generator 41 is compared in the cycloconverter to the integral of the machine line-to-line voltage to produce the triggering pulses for the individual rectifiers which control the conducting intervals so as to produce a constant frequency output from the variable frequency input signal of the main machine. Control circuit 43 which normally disables reference wave generator 41 is controlled by a speed signal so that when the main machine reaches a certain speed, a speed at which the machine converts from the motoring to the generating mode, the firing and blanking wave generating circuit 40 is disabled and the constant frequency reference wave generator 41 is enabled to take over control of the cycloconverters.

The firing sequence of the individual rectifiers in the cycloconverter rectifier banks is also controlled by a fourth signal which varies the firing point and hence, the phase angle of the rectifiers in the banks as a function of the current in the machine during the motoring mode. To this end, the current sensing and control chain, illustrated generally at 4, initially regulates the current level as a function of input current from the supply source to the cycloconverters and thereafter, as the starter picks up speed, controls the current level both in response to the machine stator current level and machine speed. As the machine increases in speed thereby increasing counter EMF generated in the stator windings of the main machine, a point is eventually reached at which the counter EMF is sufficiently high so that insufficient armature current flows to continue to provide accelerating torque. At this point, the current control network 4 introduces field weakening, i.e., reduces the magnitude of the field of the main machine thereby reducing the counter EMF increasing armature current. In addition, the current control source also operates to control the field excitation of exciter 12 to maintain the exciter current constant as the speed increases to avoid overheating when the machine is at a standstill and at very low speeds.

When the machine is at a standstill, the current in the machine windings is DC and therefore difficult to measure. At low speeds, the AC machine current is at a very low frequency and consequently also difficult to measure. Hence, machine current control at standstill and low speeds is obtained indirectly by measuring the supply current rather than the machine current. A Starting Current Control Network 45 receives, via current transformer 46, the incoming 400 Hz current from the supply source compares it with a reference current and provides an error signal proportional to any deviation. The error signal is applied to a Machine Armature Current Control Network 47 which provides a control voltage that is applied to the cycloconverters to vary the current level of the cycloconverter. Machine Armature Current Control Network 47 is also controlled in response to an Armature Current/Speed Control Network 48 which senses the machine armature current and the speed of the machine to override the effect of Starting Current Control Network 45 whenever the armature current and the machine speed reach a predetermined level. When Starting Current Control Network 45 is disabled, Machine Armature Current Control Network 47 produces control signals for the cycloconverter solely in response to the machine armature current and machine speed. To this end, machine armature current is sensed by a suitable armature current transformer coupled to one of the main machine output lines and applied as an input to network 48. It will be appreciated that although but a single current transformer is indicated that the signal representative of the armature current may be taken from all of the armature windings to present an average armature current at the regulating element.

The other input to Armature Current Speed Control Network 48 is from Rotor Position to Speed Converter 49 which is coupled to the output of one of the Hall devices associated with the PMG generator. That is, the voltage from the Hall generators represent the position of the PMG rotor. By suitably processing these position signals, as by differentiation, for example, the speed of the rotor may be sensed and the speed signal is utilized to control the armature current level and is also utilized to disable the various logic networks whenever the speed of the machine is sufficiently high to switch operation from the starting to generating mode.

As the speed of the machine increases in the starting mode, the counter EMF generated in the armature winding of machine 10 rises until at some speed, which is still less than the idling speed of the jet engine, the counter EMF equals or exceeds the supply voltage. When this occurs, the supply voltage can no longer force enough current to the armature windings to satisfy the control loop requirements. In other words, the accelerating torque is reduced until eventually there is insufficient torque to accelerate the engine further. It is, therefore, necessary to initiate field weakening for the main machine by reducing the excitation for exciter 12. At this time, the output from Machine Armature Current Control Network 47 applies a control signal to a field weakening control circuit 50 which normally maintains field weakening circuit 51 in a disabled state. Field weakening control circuit 50 now permits field weakening circuit 51 to operate and produce an output signal which is applied to field control circuit 52 which varies the energizing voltage to field excitation network 13. By reducing the excitation for the exciter which is operating as a rotating transformer, the rectified output applied to the main field is reduced and this, in turn, reduces the counter EMF in the machine until it is less than the supply voltage. Current is again supplied to the armature winding so that positive accelerating torque continues to be supplied to the output shaft which drives the jet engine.

Field control circuit 52 also operates to maintain field excitation of exciter 12 constant in the absence of field weakening. One input to field control circuit 52 is from a current transformer 53 coupled to the exciter field winding which senses the current supply to the exciter. Field control circuit 52 maintains field excitation constant by maintaining constant field current for exciter 12. The basis for this form of regulation of the field current is the fact that as the speed of the exciter increases, the effective impedance of the exciter goes down. If a constant voltage is applied to the field winding, the field current will increase with speed. This increases the output of the exciter and correspondingly increases the excitation applied to the main rotor field. Since the main rotor field is already at saturation, this would simply pump more current into the main machine field resulting in heating of the machine. Consequently, as the speed of the machine goes up and the impedance of the exciter goes down, a condition which tends to increase current flow, the current flow in the exciter is sensed and the field control circuit produces a control signal which reduces the excitation to maintain the current constant as the machine increases in speed from standstill to operating speed.

In summary, the starter generator circuit illustrated generally in block diagram in FIG. 1, consists of a main machine which is of synchronous construction, an exciter generator to supply field excitation for the main machine and a permanent magnet generator which supplies DC excitation for the exciter during the generating mode and which is also utilized to sense the position of the main machine rotor. Sensing of the main machine rotor position is achieved by means of suitably positioned Hall generators in the permanent magnet generator, which has the same number of pole pairs as and are aligned in the same manner as the main machine to produce position sensing voltages which are converted in suitable logic circuitry to produce control signals which control the rectifiers in cycloconverters 21–23 to switch current to the proper armature windings of the main machine.

In addition, the rotor position logic is modified as a function of speed to control the phase angle between armature current, flux and machine voltage to advance the phase angle with speed to ensure that proper commutation of the SCR's by the machine voltage can take place at speeds where the machine frequency is at least half of the supply frequency or greater. In this fashion, the main machine is operated as a brushless DC generator with the cycloconverter banks operating as commutating or switching means to supply current to the proper armature windings in response to the rotor position sensed by the Hall devices associated with the PMG's with the phase angle controlled by the speed of the machine.

After the machine reaches the idling speed of the jet engine, it is driven by the engine and must convert from the starting (motoring) mode to a generating mode. Speed signals are generated which disable the Rotor Position Logic Network that switches current between armature windings as a function of rotor position. The constant frequency supply voltage is disconnected from the cycloconverters and the field windings for exciter 12 are reconnected. DC excitation is applied to the exciter to operate it as a synchronous exciter-generator. Reference wave generator 41 is coupled to the cycloconverters so that the cycloconverters now function as frequency converters to convert the varying frequency output from the main machine armature now being driven by the engine, to a constant frequency output signal.

The details of the circuits for producing starting current control, machine armature control, armature current speed control, field weakening, 400 Hz firing and blanking, the details of the cycloconverter connections, and the means of firing the same, are not critical to the instant invention which is concerned with the means for modifying the rotor position logic output as a function of speed to control the phase angle of the armature current flow as a function of speed. The details of these various other circuits are described and shown in the aforementionional Lafuze Patent application, Ser. No. 440,322 and reference is hereby made to the said copending application for the details of the circuits and it is hereby incorporated by reference for a showing of the details of these particular circuits making up a part of the overall starter generator.

Figure 3:
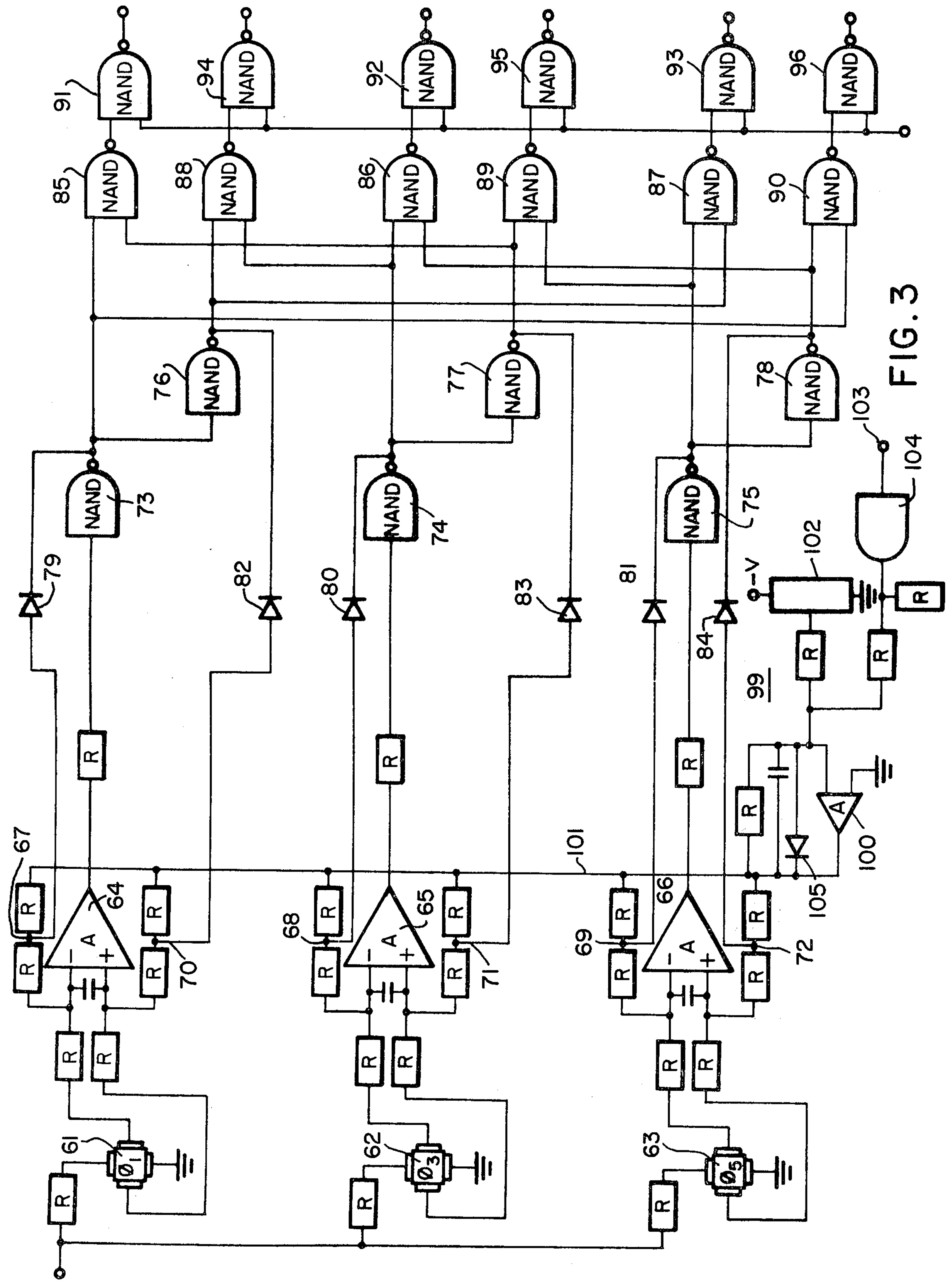
FIG. 3 is a schematic diagram of the circuitry associated with the position sensors to generate the logic which controls the firing of the phase controlled rectifiers and the manner in which it is modified as a function of speed.

The Rotor Position Logic Network is shown in FIG. 3 and processes the output signals from the Hall generators to provide enabling signals which control the current flow in the selected windings. By positioning three (3) Hall probes 120 electrical degrees apart, (for a six-phase machine), it is possible to determine when the flux associated with a given winding approaches a maximum value. From this information, it is possible to an generate enabling signal which then allows current to flow into and out of a particular winding to produce torque. In addition, the rotor position logic must ensure that the SCR associated with a given winding is triggered to allow current to flow only when the SCR associated with the next succeeding armature winding is not in condition to be triggered to prevent simultaneous current flow in successive armature winding phases. Furthermore, the Hall probes are so positioned, mechanically, with respect to the armature windings that the Hall probe output leads the actual field flux sufficiently so that the SCR's may be properly commutated.

In other words, the armature current must be sufficiently phase advanced with respect to the flux field to permit proper commutation of the SCR' s. Consequently, at low speed the phase angle can be very small producing maximum torque since the supply voltage can commutate the SCR's. As the speed increases to a level where the machine frequency exceeds half the supply frequency and commutation must be accomplished by the machine voltage, the armature current phase angle must be advanced. The Rotor Position Logic output must be modified in response to a speed signal to allow variation with speed by phase advancing the armature current sufficiently to permit commutation of the SCR's by the machine voltage.

With respect to the main enabling signal from the rotor position logic, assume for example, that the firing sequence is to be such that current flows successively into windings W1, W3 and W5 (and out of Windings 2, 4, and 6). When the hall probe indicates that current is to be supplied to Winding W3, because the flux from the field is increasing so that the flux at Winding W3 becomes high, the logic circuit must generate the enabling signal for the SCR's associated with Winding W3 only during the interval when the Hall probes also indicate that the flux at W3 is high and the flux associated with the next succeeding winding, i.e., W5, to which current is to be switched thereafter, is low. This is to ensure that only one winding at a time receives current.

Hence, with phase sequence 1, 3 and 5, it is obvious that when current is flowing in phase 1 winding W1, current flow can be switched to the phase 3 winding W3 only during the interval when the flux associated with the phase 3 winding is high but not if the flux associated with phase 5 is also high. Similarly, when current conduction is to be transferred from the phase 3 winding W3 to the phase 5 winding W5 of the machine, this can take place only when the flux at W5 is high but not while the flux at phase 1 winding W1 is also high. The SCR's associated with the individual windings are thus triggered when the SCR's associated with the next phase windings conduct current are positively disabled. The nature and significance of this relationship can best be understood in connection with the wave form diagrams of FIG. 2 which illustrate the wave form of the counter EMF generated in the phase windings W1, W3 and W5 (i.e., the machine voltages) and the output voltages from the Hall probes. Thus, in FIG. 2*a*, the counter EMF in the machine windings W1, W3 and W2 is shown by the wave form 55, 56 and 57. The output of the Hall probe amplifiers associated with phase winding W1, (and hence also with phase 4 which is 180° out of phase with phase 1) is illustrated in FIG. 2*b* by the wave form 58 whereas the outputs of the Hall probes associated with windings W3 and W5 (and hence W2 and 6) are shown by the wave forms 59 and 60 in FIGS. 2*c* and 2*d*. The outputs of the Hall probes have been processed in an operational amplifier or the like to convert the trapezoidal outputs from the Hall probes to square waves 58–60 which are displaced by 120 electrical degrees. The position of the Hall generator is such relative to windings and the counter EMF generated in the windings that the output of the Hall probe is phase advanced sufficiently relative to the counter EMF to permit the conducting SCR to be commutated into the non-conducting state when current is transferred to the next winding. Thus, at $t_0$, assume that current is flowing in phase winding W5 and is to be transferred next to phase winding W1. In order to obtain the maximum torque out of the motor, it would be desirable to allow current conduction into W5 winding until $t_1$ and then switch current conduction from the W5 winding to the W1 winding. If this were done, then the angle between the flux, the armature current, and the machine voltage would be zero degrees, the cosine of the angle is unity thereby producing maximum torque. Stating it another way, it would be desirable to allow the number 5 SCR's to conduct current into winding 5 as long as possible and turn them off at $t_1$ when the machine voltage phase reverses. However, because it may be difficult if not impossible to commutate the SCR's at $t_1$, it is necessary to advance the firing of the next SCR's, i.e., the No. 1 SCR's to allow sufficient volt seconds to turn off the previously conducting No. 5 SCR's. Consequently, the Hall probles are mechanically positioned so that the Hall voltage goes to a maximum at some time $t_0$ before $t_1$, generating an enabling or firing voltage for the No. 1 SCR's while at the same time, terminating the enabling signal for the No. 5 SCR's. When the No. 1 SCR's are turned on, the conducting No. 5 SCR's are then comutated off either by the supply voltage reversing at low speeds or by the machine voltage driving current through it at high speeds. That is, if the No. 1 SCR is triggered into conduction at $t_0$ when the counter EMF winding W5 is still more positive than the counter EMF of winding W1, it has a tendency to drive current through SCR 5 in the opposite direction. This internal current loop between the SCR's will tend to turn the No. 5 SCR off before $t_1$ since the counter EMF volt seconds from $t_0$ to $t_1$ of wave form 55 is available to commutate the No. 5 SCR off. It will be understood that this commutation of the SCR's by the machine voltage takes place at speeds where the frequency of the machine voltage is at least half that of the supply voltage or larger. As pointed out previously, at standstill or low speed, the frequency of the supply voltage is so much greater than the frequency of the machine voltage, that there is a phase reversal of the supply voltage every few degrees of the machine voltage and this phase reversal reverses the voltage across the anode and cathode path of the conducting SCR and commutates the SCR off without need for commutation of the SCR by driving current through the SCR in the manner described above. However, as the machine speed and the machine frequency increases, the supply signal can no longer be relied on to commutate the SCR's off and the machine voltage must be utilized to provide the commutation of the SCR's. Consequently, as will be described in detail below, the Rotor Position Logic Network is so constituted that at standstill and speeds up to those at which the machine frequency is one-half the supply frequency, the phase advance is minimal since the supply voltage is being relied on for commutating the SCR. As the speed exceeds the speed at which the machine voltage frequency equals or is greater than one-half of the supply frequency, the speed signal modifies the rotor position logic enabling signals so that the enabling signals are phase shifted to increase the phase angle to allow commutation of the armature current by the machine voltage with increasing speed.

It can also be seen from the voltages 58–60 that the enabling voltage for the No. 1 SCR's in the various banks produced in the rotor position logic cannot be coextensive with the enabling voltages for the No. 3 SCR's. That is, the field flux at succeeding windings and the Hall output voltages overlap so that at time $t_2$ the phase 3 Hall probe voltage goes positive and the enabling signal for the No. 3 SCR's in the various banks is generated. It is therefore necessary to terminate the enabling voltage for the No. 1 SCR's at the time the No. 3 SCR's are enabled for otherwise it would not be possible to turn off the No. 1 SCR's and turn the No. 3 SCR's on. Hence, when the SCR's associated with a given phase winding are enabled to allow current transfer to that winding from the previous winding in the sequence, this can take place only if the SCR's associated with the succeeding winding to which current is to be transferred are disabled. Otherwise miscommutation takes place. The following Truth Table indicates the relationships and establishes the intervals during which enabling voltages for the SCR's may be generated to proper switching of current between the windings.

| Hall Probe Condition | Negative Bank SCR Which May be Fired | Positive Bank SCR Which May be Fired |
|---|---|---|
| 1 (High) . $\overline{3}$ (Low) | 1N | 4P |
| $\overline{1}$ (Low) . 3 (High) | 4N | 1P |
| 3 (High) . $\overline{5}$ (Low) | 3N | 6P |
| $\overline{3}$ (Low) . 5 (High) | 6N | 3P |
| 5 (High) . $\overline{1}$ (Low) | 5N | 2P |
| $\overline{5}$ (Low) . 1 (High) | 2N | 5P |

FIG. 3 illustrates one form of the Rotor Position Logic Network which generates the enabling voltage for the various SCR combinations to permit current flow into and out of the armature windings in the proper sequence when the flux is maximum in the positive and negative directions with respect to those windings. Also incorporated in the logic network is a means for modifying the enabling voltages in response to a signal proportional to machine speed to shift the phase of the enabling voltages and to vary the phase angle to permit commutation of the SCR's by the machine voltage over a critical speed range where the machine frequency is equal to or greater than one-half of the supply voltage frequency.

The three Hall devices $\phi_1$, $\phi_2$ and $\phi_3$ which sense the PMG field and hence the corresponding main machine rotor field, are illustrated schematically at 61, 62 and 63. The Hall probes are positioned 120 electrical degrees apart and consist of slabs of Hall material which has an energizing voltage from a source of positive potential +V applied across one pair of faces of the Hall material. A Hall voltage is generated across the orthogonal faces in response to flux applied to the device. The Hall devices, as pointed out previously, are mechanically positioned so that the output of the Hall probe is advanced relative to the machine counter EMF and flux by an angular amount sufficient to permit commutation of the SCR's by the machine voltage. The Hall voltages which are generally trapezoidal in shape are fed in phase opposition to the inverting and non-inverting input terminals shown respectively by the minus (−) and plus (+) signs of a plurality of operational amplifiers 64, 65 and 66 which drive a series of digital gates shown generally at 67, presently to be described, which generate the enabling voltages for the SCR's.

The operational amplifiers have a very high gain so that they saturate at a very low threshold voltage. When the voltage associated with the inverting terminal of each operational amplifier is positive and exceeds the threshold voltage the output of the operational amplifier goes negative. Correspondingly, when the Hall voltage reverses and the input to the non-inverting terminal becomes positive and exceeds the threshold voltage, the output of the operational amplifier switches and becomes positive. As a result, a square wave is generated from the Hall voltages at the outputs of the amplifiers. Feedback paths 67–69 are provided to the inverting inputs and feedback paths 70–72 are provided to the non-inverting terminals of each of the operational amplifiers. A control signal proportional to the machine speed from network 99, presently to be described in detail, is coupled to the individual positive feedback paths of the operational amplifier and cause the operational amplifiers to switch with a hystersis or delay proportional to the feedback signal. Therefore, the speed related signal from network 73 delays or advances the switching of the operational amplifiers as a function of machine speed, thereby shifting the phase of the enabling signals generated by the digital network and varying the phase angle at which commutation is initiated.

The square wave output voltages from the operational amplifiers are it will be appreciated, 180° out of phase with the Hall voltages and are therefore applied to a series of inverting NAND gates 73–75 to invert the square waves and produce square waves which are in phase with the individual Hall voltages from the sensor 61–63. The output from gates 73–75 are also applied as inputs to a set of NAND gates 76–78 which invert the voltages again so that the outputs of gates 73–75 and 76–78 are respectively in phase and out of phase with the Hall voltages from sensors 61–63.

Coupled between the outputs of NAND gates 73–75 and 76–78 and the positive feedback paths of the operational amplifiers, are a first set of switching diodes 79–81 coupled between the output of gates 73–75 and the feedback paths 67–69 associated with the inverting inputs of the amplifiers and a second set of switching diodes 82–84 coupled between the outputs of NAND gates 76–78 and the feedback paths 70–72 associated with the non-inverting terminals of the operational amplifiers. The individual diodes are controlled by the outputs of the NAND gates, which in turn, are controlled by the output of the operational amplifiers to apply the speed control voltage selectively to the inverting and non-inverting inputs. Thus, if the input to the inverting terminal of amplifier 64 is positive, its output is negative and the output of NAND gate 73 is at a high or logic 1 level. This reverse biases diode 79 permitting the positive speed signal from network 99 to be applied unhibited to the amplifier inverting input thereby adding the speed signal to the Hall voltage from sensor 61. Diode 82, on the other hand, is forward biased since the output of NAND gate 76 is at a low or logic zero level thereby clamping the junction of feedback network 70 associated with the non-inverting terminal of operational amplifier 64 to ground and virtually no speed signal goes to the non-inverting input of operational amplifier 64. In a similar manner, the other diodes 80–81 and 83–84 associated with the NAND gates control the speed signal input to operational amplifiers 65 and 66. Conversely, if the output of the operational amplifier 64 is positive, NAND gate 73 is at the low or logic 0 level whereas NAND gate 76 is at the high or logic 1 level. Diode 79 is, therefore, forward biased clamping the junction of the resistors of feedback network 67 to ground and inhibiting passage of any of the speed signals to the inverting terminal. Diode 82, on the other hand, is reverse biased and almost all of the speed signal goes unhibited into the amplifiers non-inverting terminal to control switching of the amplifiers, a function of the Hall voltage and the speed signal. It is therefore seen that switching diodes 79–84 control the application of the speed signals to the non-inverting and inverting terminals of the operational amplifiers to add these voltages to the Hall voltages and thereby control the conduction switching period of the operational amplifier. As will be pointed out in detail subsequently, the enabling signal is shifted in phase, varying the phase angle as a function of speed.

The outputs from NAND gates 73–75 and 76–78 are applied to a plurality of further NAND gates which combine the signals in such a manner that enabling signals are generated only if the conditions set forth in the above mentioned Truth Table are present. That is, enabling signals are generated for the SCR's associated with a given winding to permit transfer of current to that winding, only if the flux associated with that winding is high but the flux associated with the winding to which current is to be transferred thereafter is low. Thus, the outputs from NAND gates 73–75 which are in phase with the output wave form from the Hall sensors and thus represent the flux states at the W1, W3 and W5 windings, are applied to a series of NAND gates 85–87 whereas the output from NAND gates 76–78, which are 180° out of phase with the Hall voltages are applied to a second set of NAND gates 88–90. The other inputs to NAND gates 85, 86 and 87 are respectively from NAND gate 77, NAND gate 78 and NAND gate 76 which represent the inverse of phase 3, phase 5 and phase 1 ($\bar{3}, \bar{5}, \bar{1}$) sensors respectively. The outputs from NAND gates 85-87 are therefore negative when both inputs are positive; for NAND gate 85 when the flux is high at winding 1 but low at winding 3 ($1.\bar{3}$ permitting current transfer from winding 5 to winding 1), for NAND gate 86 when flux is high at winding 3 and low at winding 5 ($3.\bar{5}$) permitting current transfer from winding 1 to winding 3); and for NAND gate 87 when flux is high at winding 5 and low at winding 1 ($5.\bar{1}$) permitting current transfer from winding 3 to winding 1. The outputs of NAND gates 88–90, on the other hand, go negative for the flux condition, $3.\bar{1}$, $5.\bar{3}$ and $1.\bar{5}$ respectively. The outputs from NAND gates 85–90 are applied as one input to NAND gates 91-96 with the other input being from a start mode gating signal input terminal 97 which applies a positive voltage to the other input terminals whenever the system is enabled. NAND gates 91 through 96 produce positive output enabling signals for their associated SCR's whenever the associated NAND gates 85 etc. goes negative. Thus, the output of NAND gate 91 when NAND gate is negative, i.e., when the flux is high at armature winding 1 but not armature winding W3 (i.e., $1.\bar{3}$, thus permitting transfer of current from phase winding 5 to phase winding 1. NAND gate 92 is positive when NAND gate 88 is negative, i.e., the flux is high at winding W3, but not winding W1 (i.e., $3.\bar{1}$). The outputs of NAND gates 91 and 92 may therefore be used to trigger the No. 4 SCR (4P) in the positive bank, i.e., the bank which permits current flow out of the machine to to permit current flow out of the phase 4 winding (which is complementary to the phase 1 winding) and the No. 1 SCR's (1N) in negative banks, to permit current flow into the phase 1 winding. NAND gate 92 enables the No. 1 SCR's in the positive bank (1P) and the No. 4 SCR's in the negative bank (4N) to permit reversal of current flow in this pair of windings. NAND gate 93 and 94 are respectively positive when the flux is high at winding W3 but not winding W5 (i.e., $3.\bar{5}$) permitting transfer of current from winding 1 to winding 3 and high at winding W5 but not at winding W3 ($5.\bar{3}$). The outputs of NAND gates 93 and 94 thus respectively trigger the No. 3 SCR in the negative bank and the No. 6 SCR in the positive bank in the case of NAND gate 93 and the No. 3 SCR in the positive bank and the No. 6 SCR in the negative bank in the case of NAND gate 94.

Thus, when the flux is high at winding W5 but not winding W1 (i.e., $5.\bar{1}$) NAND gate 95 is positive permitting transfer of current from winding 3 to winding 5. When the flux is high at winding W1 but not winding W5 ($1.\bar{5}$) the output from NAND gate 96 goes positive. The outputs of these two NAND gates enable the No. 2 SCR's in the positive banks and the No. 5 SCR's in the negative banks in the case of NAND gate 95 and the No. 2 SCR's in the negative banks and the No. 5 SCR's in the positive banks in the case of NAND gate 96.

We have seen from the foregoing that the rotor position logic network selectively enables the individual SCR's to transfer to current to a given winding whenever the Hall probe voltages indicate the flux at that particular winding is high and also that the flux density at the next succeeding winding is low.

The enabling signals to the various SCR's are applied simultaneously to all of the SCR's associated with that winding. The particular SCR that is fired to supply current into or out of the winding is controlled not only by the SCR enabling voltage, but also by the phase enabling voltage. The manner in which a phase enabling voltage illustrated in block diagram form at 40 in FIG. 1, is described in detail in the copending Lafuze application, Ser. No. 440,322 incorporated by reference herein. For example, if the output of one of the NAND gates from the rotor position logic network indicates that the No. 1 SCR in the positive bank and the No. 4 SCR in the negative bank is to be fired, all of the No. 1 SCR's in all of the positive banks (which equal the number of machine phases), are enabled as well as all the No. 4 SCR's in the negative banks. However, only one No. 1 SCR in the positive bank and one No. 4 SCR in the negative bank is triggered since only one supply voltage phase is positive with respect to the other phases to allow firing of the No. 4 negative SCR and only one supply voltage is negative with respect to the other phases to allow firing of the No. 1 positive SCR. Thus, current flow into and out of the armature windings are controlled by the phase enabling signals and the rotor position signals which control the particular armature winding to which current is to be supplied at a given time.

The machine speed signal generating network 99 includes an integrating amplifier 100 having an output coupled over lead 101 to the feedback networks 67–72 associated with the operational amplifiers 64–66. Coupled to the inverting input terminal of integrating amplifier 100 is a negative reference signal from a reference potentiometer 102 which maintain the output of integrating amplifier at a high positive value at low speeds. The reference potential from potentiometer 102 is sufficiently negative to drive integrating amplifier into saturation and produce a highly positive output voltage from the amplifier. Also coupled to the inverting terminal of the integrating amplifier is a signal proportional to machine speed. A signal proportional to speed from speed signal generating network 19 is coupled to input terminal 103 and AND gate 104. The output of AND gate 103 is a variable width positive pulse the duration of which is proportional to the speed of the machine. Since the positive pulse is applied to an integrating amplifier, the voltage at the inverting terminal due to the speed responsive signal from AND gate 104 has an integrated positive value proportional to the width of the incoming pulse. At low speeds and up to a predetermined speed, i.e., the speed at which the machine frequency equals one-half of the supply frequency, the negative voltage from reference potentiometer 102 is sufficiently large to override the effect of the positive speed voltage from AND gate 104 so that integrating amplifier 100 remains in the positive saturation and the output from the amplifier as applied to the operational amplifiers remains at a maximum positive voltage. As the machine speed goes above the predetermined speed, the speed signal becomes increasingly more positive and reduces negative voltage at the inverting terminal of the amplifier sufficiently so that the output of the inverting amplifier becomes less positive with increasing speed. When the machine reaches a speed at which the machine frequency equals the supply frequency the input voltage from AND gate 103 is sufficiently large to switch the output of amplifier 100. The output of the amplifier however, is clamped at a voltage equal to the diode drop of diode 105 in the feedback path, below ground potential.

The voltage variations of the amplifier output with speed is illustrated in FIG. 4 which shows speed is plotted along the abscissa and the output voltage from amplifier 100 along the ordinate. From standstill to the predetermined speed S1, at which the machine frequency is one-half of the supply frequency, the output voltage from integrating amplifier 100 is at a positive maximum value. As the machine speed exceeds S1 the input from AND gate 104 becomes sufficiently positive to reduce the output voltage from the amplifier until at the speed S2 where the machine frequency equals the line frequency the output from the integrating amplifier has gone negative and is clamped at a value equal to the voltage drop across diode 105 below ground. At any speed between S1 and S2 such as at $S_x$, the output of the amplifier is a positive voltage $S_x$ having a magnitude which varies inversely with speed. This positive voltage is applied via feedback networks 67–72 to the input terminals of operational amplifiers 64–66. The positive speed responsive voltage is added to the voltage from the Hall sensors and delays switching of the operational amplifiers as a function of the speed signal. The Hall sensors are mechanically positioned for maximum position advance, i.e., to provide the maximum phase advance for commutating of the SCR's by the machine voltage and therefore represent the maximum phase angle between the armature current flux and the machine voltage. The addition of the speed signal delays switching of the operational amplifiers by the amount proportional to the magnitude of the speed signal and, in a manner presently to be described in connection with the wave form diagrams of FIG. 5, shifts the phase of the enabling signal from the Rotor Position Logic reducing the angle of advance as a function of speed. Thus, at standstill and low speeds, when the positive speed related voltage is at a maximum, switching of the operational amplifier is delayed by a maximum amount. The enabling signals are phase shifted in a direction such that the phase angle of advance is minimized and the torque is maximized at the low speeds where commutation is provided by the supply voltage. As the machine reaches the predetermined speed where the machine frequency is one-half of the supply voltage, the positive speed signal is reduced in amplitude switching delay of the operational amplifier is, correspondingly reduced. The phase shift of enabling voltages at the output of the Rotor Position Logic is reduced and the phase angle increases so that additional current may be commutated by the machine voltage. At the speed where the machine frequency equals the supply frequency, the speed signal goes to zero and slightly negative so that there is no further delay in swithing of the operational amplifiers and the enabling voltages from the Rotor Position Logic are shifted in phase to produce the maximum phase advance as established by the mechanical position of the rotor position sensing Hall devices.

In summary, the system is arranged so that the rotor position sensing devices are positioned for maximum phase advance thereby permitting maximum current commutation by the machine voltage. At lower speeds, the enabling signals as produced by the Rotor Position Logic are modified to reduce the phase advance to a minimum value. As a result, the phase angle between armature current, flux and machine voltage is minimized and the torque is high. As the machine speed reaches the critical range, the speed control signal is modified to increase the phase advance to permit commutation of increasing amounts of current by the machine voltage. For a better understanding of the mode of operation, assume for the moment, that the output of operational amplifier 64 at a particular time is negative. Logic gate 73 which is driven by the output of operational amplifier 64 is therefore at its high or logic 1 state whereas the output of NAND gate 76 which is driven by NAND gate 73 is at the low or logic zero state. In this condition, the positive speed signal applied is impressed on the inverting input of amplifier 64 over feedback network 67 since switching diode 79 is reverse biased by the positive or logic 1 output of NAND gate 73. Virtually, none of the speed signals go to the non-inverting input of operational amplifier 64 since diode 82 is conducting due to the low or logic 0 level at the output of NAND gate 76 clamping the junction of the series resistors in the feedback path essentially at ground potential. With the output of operational amplifier 64 negative, the input to its inverting terminal is positive. Hence, the positive speed signal from network 99 is therefore added to the positive signal from the Hall probe 61 at the inverting terminal of the amplifier. When the sensor output reverses, it must overcome the thereby speed signal before the output of amplifier 64 switches from negative to positive. When the amplifier output goes positive the NAND gates reverse states with NAND gate 73 and 76 respectively going to the logic zero and logic 1 levels. Switching diode 79 is now driven into conducting state whereby clamping the junction of the resistors in feedback path 67 to ground potential removing the positive speed signal from the inverting terminal. Diode 82, on the other hand, is driven into the non-conducting state so that the full speed signal from integrating amplifier 100 is applied over feedback path 70 to the non-inverting terminal of the amplifier thereby adding this positive voltage to the signal from the Hall sensor 61 applied to the non-inverting terminal. It can be seen therefore, that the application of a speed signal from network 99 delays switching of the operational amplifiers and also delays the initiation and termination of the enabling signals from the logic network thereby shifting the enabling signals in phase. This phase shift of the enabling signals results in a reduction of the phase advance so that the phase angle between the armature current, the flux, and the machine voltages is reduced and controls the torque produced by the machine. The speed signal is at maximum at low speed so that the phase shift of the enabling signals is maximum, reducing the phase advance and reducing the phase angle between the armature current and the machine voltage thereby producing maximum torque at the low speeds. As the machine speed reaches the critical range, the voltage is reduced as is the phase shift of the enabling voltage thereby increasing the phase advance. By increasing the phase advance, the amount of current that can be commutated by the machine voltage is increased although at the price of a reduction in torque since the phase angle between current, flux and machine voltage is also increased. At maximum speed, the speed signal goes essentially to zero so that the phase advance for the Rotor Position Logic signals is that established by the mechanical position of the rotor position sensor which, as has been pointed out previously, are set for maximum phase advance for commutation by the machine voltage of the maximum expected current.

Figures 5A, 5B, 5C, 5D, 5E, 5F, 5G, 5H, 5I:
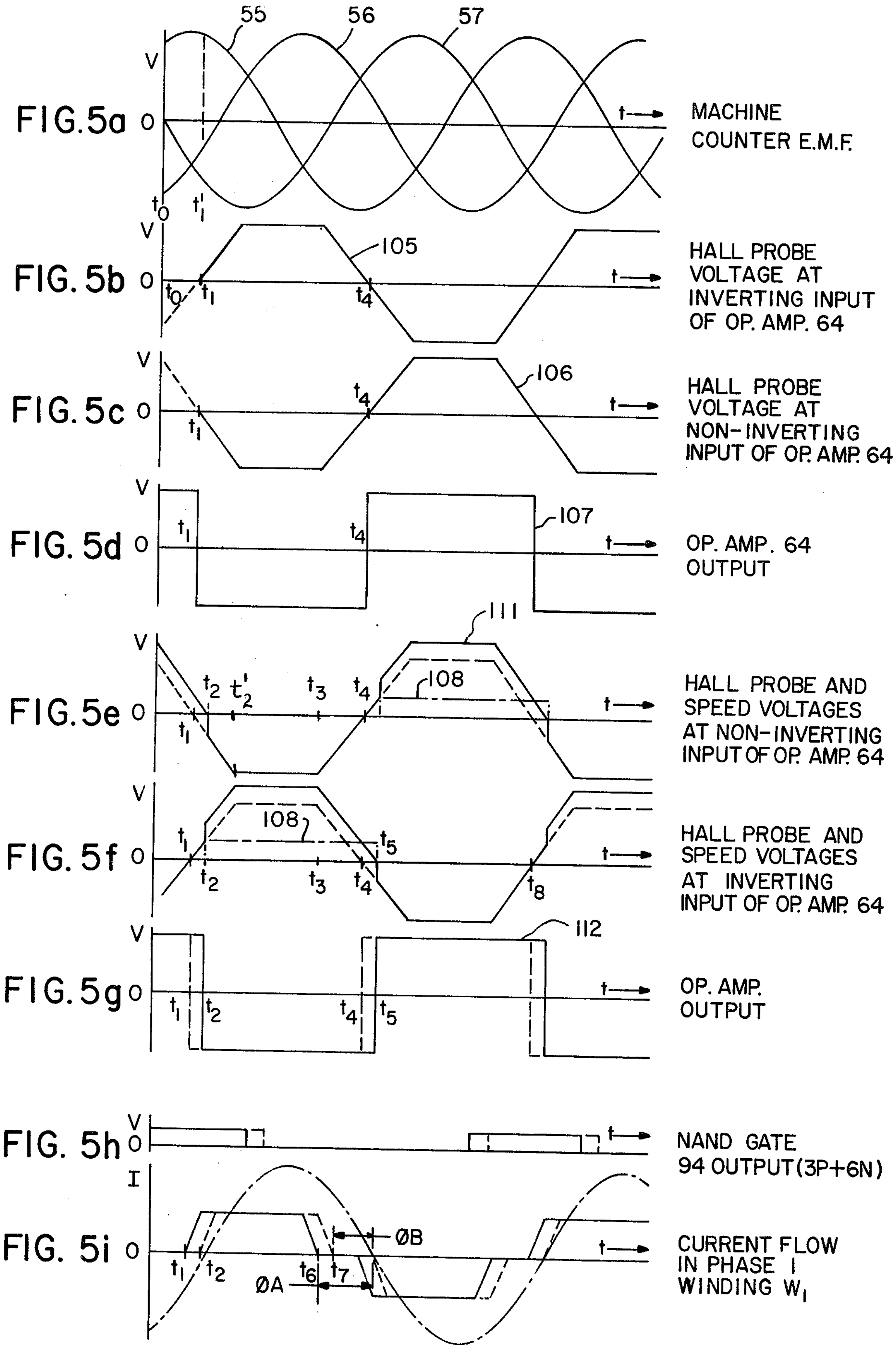

The manner in which the Rotor Position Logic Network of FIG. 3 functions to control the phase angle as a function of speed may best be understood in connection with FIGS. 5(*a*) through 5(*h*) which illustrate the wave forms in various portions of the Rotor Position Logic circuitry and shows the manner in which the current flow in phase winding W1 is varied as a function of speed to control the phase advance and hence the phase angle between the current and the machine voltage to permit commutation of the SCR's.

FIG. 5(*a*) shows the machine voltages 55, 56 and 57 for the three of the six phases of the machine, namely, the counter EMF induced in the windings 1, 3 and 6. The voltages induced in windings 2, 4 and 5, which are 180° out of phase with these windings are not shown. However, the manner in which these affect control of the rotor logic circuitry is symmetrical with that of phases 1, 3 and 5 and hence, they will not be described as shown in the following wave form diagrams. The counter EMF induced in windings W1, W3 and W5 are in phase with the field flux produced by the rotor of the main machine. At time $t_0$, let it be assumed that current is flowing into phase winding 5 and out of phase winding 2 utilizing the current flow convention of the aforesaid Lafuze application Ser. No. 440,322, i.e., negative current is current flowing into any given phase and positive current is current flowing out of any phase winding. With current flowing into phase winding 5 the transfer of current (assuming a 5, 1, 3 phase sequence) is to phase winding 1. Thus, at $t_1$, the No. 1 SCR in one of the negative banks and No. 4 SCR in one of the positive banks must be enabled by the Rotor Position Logic Circuitry to allow current to flow into and out of phase windings 1 and 4. As pointed out previously, the phase 1 rotor position sensing device is mechanically positioned to provide the maximum desired phase advance for commutating the SCR's by the machine voltage at the worst current conditions. Hence, the position sensor associated with the phase winding 1 is so positioned as to lead the machine no load voltage by the desired angle of advance. Thus, at time $t_1$, the Hall sensor associated with winding W1 senses a change in the flux position even though flux at winding W1 still has not yet changed. The Hall voltage across sensor 61 is shown in FIG. 5(*b*). The Hall voltage 105 from sensor 61 is impressed on the inverting terminal of amplifier 64. Simultaneously, the inverse of the Hall voltage, i.e., a Hall voltage which is 180° out of phase shown by curve 106 in FIG. 5(*c*) is applied to the non-inverting terminal of the operational amplifier. Although the Hall voltages, like the flux applied thereto, are generally trapezoidal in shape, the operational amplifiers have sufficiently high gain so that they saturate at a very low voltage level. Thus, at time $t_1$ when the Hall voltage at the inverting terminal goes positive and the Hall voltage at the non-inverting terminal goes negative, the output of operational amplifier 64 saturates to produce a negative output in response to the positive input to its inverting terminal. The voltage at the inverting terminal remains positive until at $t_4$ when the Hall voltage reverses and becomes negative. Similarly, the Hall voltage at the non-inverting terminal also reverses at $t_4$ and becomes positive. At time $t_4$ the output of the operational amplifier reverses and becomes positive. Thus, the output of the operational amplifiers as illustrated by curve 107 in FIG. 5(*d*) is a square wave which is 180° out of phase with the Hall voltage and the field flux. This amplifier output is thereafter inverted in NAND gate 73 to produce an output signal from NAND gate 73 which is in phase with the Hall voltage and the flux. The output signal from the operational amplifiers and the NAND gates are then processed in the digital gates to produce the enabling signals for the SCR's associated with the respective windings.

FIGS. 5(*e*) and 5(*f*) illustrate the voltage at the inverting and non-inverting terminals of operational amplifier 64 with a positive speed signal from network 99 added. This is, the voltages at the input terminals to the operational amplifiers and the output from the operational amplifiers 64 illustrated in FIG. 5(*b*)-5(*d*) illustrate the situation where there is no speed signal applied to the operational amplifier, i.e., the high speed condition where the maximum phase advance is desired for commutation purposes. FIGS. 5(*e*) et seq, on the other hand, illustrate the manner in which the addition of the positive speed voltage to the operational amplifier feedback networks produce a delay in switching of the operational amplifiers as a function of the speed signal thereby shifting the phase of the enabling signal for the SCR's and hence, the phase angle of the armature current in each winding with respect to flux and the machine voltage. FIGS. 5(*e*) and 5(*f*) show voltages at the non-inverting and inverting terminals of operational amplifier 64 respectively. In 5(*e*) the out of phase Hall voltage 106 is applied to the non-inverting terminal. Similarly, in FIG. 5(*f*) the in-phase Hall voltage 105 applied to the inverting terminal of the operational amplifier. A positive speed voltage represented by the dot and dash curve 108 is applied to the inverting terminal at time $t_2$ so that the voltage 110 at the inverting terminal is the sum of the positive speed voltage 108 to the Hall voltage 105 from the sensor 61. At $t_1$, when the Hall voltage applied to the inverting terminal and goes positive, which would normally tend to drive the output of the operational amplifier 64 negative, the voltage at the non-inverting terminal is still positive by an amount equal to the speed voltage 108 as seen in FIG. 5(*e*). Consequently, the voltage at the non-inverting terminal does not go to zero until time $t_2$ when the voltage at the non-inverting terminal has reversed phase and gone negative by an amount equal to the speed voltage applied from speed network 99. At time $t_2$, the output of the operational amplifier changes from the positive to the negative saturated state. As the output of operational amplifier 64 changes state, the NAND gate 73 goes to the high or logic 1 level and NAND gate 76 goes to the low or logic zero level. Diode 79 is driven into non-conducting state whereas the diode 82 associated with NAND gate 76 is driven into conduction clamping the junction of the feedback path 70 associated with the non-inverting terminal of operational 64 essentially to ground potential. As a result, the speed voltage is removed from non-inverting terminal and now applied to the inverting terminal. Thus, as shown at time $t_2$ in FIG. 5(*f*) the speed voltage 108 is virtually instantaneously added to the voltage from the Hall sensor 61 and the voltage 110 at the inverting terminal jumps to a level which is the sum of the speed voltage and the sensor voltage. Simultaneously, the speed signal is removed from the non-inverting terminal and the voltage at the non-inverting terminal drops virtually instantaneously to the value of the Hall voltage at time $t_2$. From time $t_2^1$ until $t_3$, the Hall voltage stays at a constant value. At $t_3$, the voltage from Hall sensor 61 begins to drop in value until at $t_4$, the phase of the Hall sensor voltage reverses. However, the voltage at the inverting terminal is still positive by an amount equal to the speed voltage 108 from integrating amplifier 100. Thus, the amplifier voltage remains negative because the voltage at the inverting input is still positive by an amount equal to the speed signal. It is not until $t_5$ when the Hall voltage has gone negative by an amount equal to the speed signal that the voltage at the inverting terminal starts to go negative.

Thus, at time $t_5$, the voltage at the inverting terminal goes to zero switching the output of the operational amplifier driving the amplifier from the negative saturation to positive saturation. As the amplifier is driven into positive saturation, NAND gate 73 does to the low or logic level and NAND gate 76 goes to the high or logic 1 level. As a result, diode 79 conducts, clamping the junction of the resistors in feedback path 67 connected to the inverting terminal to ground potential thereby removing the speed signal from the inverting terminal. Diode 82, on the other hand, is driven into the non-conducting state so tht the speed signal is now applied fully to the inverting terminal thereby switching the voltage at the inverting terminal to a value equal to the sum of the positive speed voltage and the now positive Hall sensor voltage applied to the inverting terminal. The output from the operational amplifier, as illustrated in FIG. 5(*g*) by curve 112 switches at $t_2$ and $t_5$ rather than at $t_1$ and $t_4$ with the amount of delay being proportional to the magnitude of the speed voltage.

By shifting the switching of the operational amplifier, the switching times of the digital gates driven by the operational amplifiers are shifted correspondingly thereby introducing a phase delay or phase shift in the enabling voltages for the SCR's which are proportional to the speed voltage applied to the network. The manner in which this affects the phase angle between the armature current and the machine voltage and the field flux is illustrated in FIG. 5(*h*). In FIG. 5(*h*) the machine voltage 55 induced in phase 1 is shown by means of the dash and dot curve and the flow of armature current by the solid line curve 115. Thus, solid line curve 115 represents the armature current flow for maximum phase advance. With maximum phase advance an enabling signal is generated at $t_1$ for the SCR's associated with the phase 1 winding and the SCR's associated with the phase 5 winding are commutated off. Thus, at some time after $t_1$, the current in winding 1 reaches a maximum value and positive current flows into winding W1. Positive current flow into winding 1 continues until the Hall position sensor associated with winding W3 senses the flux to indicate a current transfer from winding 1 to winding W3 is required. The logic circuitry associated with the SCR's for winding 3 thereafter produce an enabling signal for the SCR's associated with winding 3, while at the same time, the enabling signal for the winding 1 SCR's is terminated and the winding 1 SCR's is terminated and the winding 1 SCR's are commutated off. Thus, at time $t_6$, the current in winding 1 terminates and goes to zero. It can be seen therefore that for this condition for maximum phase advance a phase angle $\theta_a$ exists between the armature current and the machine voltage and the field flux. Thus, where maximum phase advance is provided, in order to commutate the SCR's by the machine voltage, the phase angle between the armature current and the machine voltage is such that the torque is reduced since the torque is a function of the cosine of the angle between the current, the flux and the voltage.

If however, the speed signal is applied to the rotor position logic thereby delaying switching of the operational amplifiers and shifting the phase of the enabling signals, the phase angle between the current and the voltage is reduced thereby increasing the torque. Thus, for example, for the condition shown in FIGS. 5(*b*) through 5(*g*), with the speed signal with an amplitude shown by curve 108 in FIGS. 5(*e*) and 5(*f*) the operational amplifier switches at $t_2$ and $t_5$ rather than $t_1$ and $t_4$ thereby delaying the switching of the operational amplifier and the phase shifting the enabling signal for the SCR's. As a result, of this phase shift of the enabling signals, the positive current flow into phase winding 1 no longer is initiated at time $t_1$ but is initiated at time $t_2$ instead and now terminates at time $t_7$. It can be seen therefore, that the armature current flow in winding W1 has been shifted in phase so as to reduce the phase angle between the armature current and the winding by an amount which is proportional to the speed signal. The phase angle between the current and the voltage is now $\theta_b$ and with the reduced phase angle, the torque produced by the motor is increased. As has been pointed out previously at the lowest speeds, the speed signal is very high and the amount of phase shift is directly proportional to the speed signal so that a standstill the low speeds, the phase shift is maximum and the phase angle between armature current and the machine voltage is reduced to a minimum thereby maximizing the torque output of the machine. As the speed of the machine increases, the positive speed voltage applied to the operational amplifiers is reduced thereby reducing the delay in switching of the amplifiers and reducing the phase shift of the enabling signals and the phase shift of the armature current. This increases the phase advance between the current and the machine voltage which reduces the torque but, on the other hand, permits increasing amounts of current to be commutated by the machine voltage as speed increases and the machine frequency approaches that of the supply frequency. At a speed when the machine frequency and the supply frequency are equal, the speed signal goes to zero and the phase shift of the enabling signals and the phase angles is reduces to zero and the phase angle between the armature current and the machine voltage is at a maximum. This reduces the torque. However, the phase angle being at a maximum, permits the maximum current to be commutated by the machine voltage.

It can be seen therefore that an arrangement is provided in which the rotor position sense is controlled so that the phase angle between armature current machine voltage is optimized for various speeds to provide maximum torque at standstill and low speeds when commutation of the SCR's can be readily achieved by means of the supply voltage and that the phase angle is increased as speed increases to allow commutation of the SCR's by the machine voltage even though torque is reduced at these higher speeds. However, by optimizing the phase advance as a function of speed, the overall efficiency of the machine is increased since maximum torque can be obtained from the machine at the low speeds and at standstill.

While a particular embodiment of the invention has been illustrated and described, it will be apparent that various modifications thereof may obviously be made in the various instrumentalities and arrangement described without departing from the true spirit and scope of the invention as defined in the appended claims.

What is claimed as new and desired to be secured by letters patent of the United States is:

1. In a starter-generator system, the combination of:

a. a dynamoelectric machine for operation both as a brushless DC motor and as a constant frequency AC generator, b. cycloconverter means coupled to said machine for selectively supplying current to the machine armature windings during motoring operation and for converting the frequency of the output signal from the machine to provide a constant frequency output during generator operation, said cycloconverter means including banks of oppositely poled, phase controlled, gated, switching devices.

c. means to operate said dynamoelectric machine as a brushless DC motor including, 1. a source of constant frequency alternating supply voltage coupled to said banks of switching devices,
2. means for sensing the rotor position of said dynamoelectric machine and for producing in response thereto enabling signals to gate selected ones of said switching devices in sequence to permit current flow in selected armature windings as a function of rotor position so that current flows in the armature winding having flux associated therewith to produce positive torque,
3. means for controlling the phase angle between armature current, flux, and machine voltage over a predetermined speed range only to provide a fixed phase angle over a speed range wherein the machine voltage frequency does not exceed one-half of the supply voltage and to vary the phase angle at speeds wherein the machine voltage frequency exceeds one-half the supply voltage frequency, including means responsive to the speed of the machine for shifting the phase of the enabling signals to vary the angle at which the switching devices are gated over the speed range wherein the machine voltage frequency exceeds one-half of the supply voltage frequency, to permit commutation of the switching devices by the machine voltage whereby the said gating angle is maintained at a fixed minimum value at speeds up to said range thereby maximizing torque, and is increased with speed over said speed range, d. a source of constant frequency reference waves, e. means for converting the system from the motoring to the generating mode including means responsive to the speed of the dynamoelectric machine for disconnecting the constant frequency supply voltage, and for disconnecting the rotor position sensing and enabling signal producing means from said bank of switching devices when the machine reaches a predetermined speed at which the machine is to operate as a generator, and means for coupling the source of constant reference frequency waves to said banks of said switching devices for said cycloconverter means when the machine reaches said predetermined speed.

2. The starter-generator system according to claim 1 wherein said rotor position gating means includes means for sensing said rotor pole position and for producing a polyphase signal proportional to the pole flux, means for comparing said polyphase signals and means for producing a gating signal when the pole flux adjacent a given armature winding is high but the flux adjacent the next armature winding is low, and means responsive to the machine speed for shifting the phase of said gating signal to produce a minimum advance of the gating angle for said switching devices at speeds up to a speed where the machine voltage frequency exceeds one-half of the supply frequency and to advance the gating angle as the machine speed exceeds the speed at which the machine frequency is greater than half the supply frequency to thereby permit commutation of said switching devices by the machine voltage.

3. A starter-generator according to claim 2 wherein the means for producing a gating signal includes a switching amplifier means responsive to said polyphase signal proportional to pole flux to produce switching of said amplifiers in response to the flux, and means to vary the switching point of said amplifiers as a function of said speed signal to vary the phase of the enabling signals generated therefrom and the gating angles of said switching devices.

4. The starter-generator according to claim 2 wherein said rotor position gating means includes a permanent magnet generator mounted on the same shaft as said dynamoelectric machine and having a rotor with the same number of poles as said dynamoelectric machine, a plurality of Hall probes mounted in the air gap of said permanent magnet generator to produce phase displaced output voltages indicating the pole position of the dynamoelectric machine rotor, said Hall probes being so positioned as to produce polyphase signals proportional to flux which are phase advanced relative to the flux relationship to the machine armature windings, said speed signals varying the phase shift of said enabling signal so that the gating angle of said switching device is less than the phase advance of said polyphase signals at speeds below that at which the machine frequency is less than half of the supply frequency and is increased as the machine voltage speed increases to increase the machine voltage frequency to a value greater than one-half of the supply frequency.

* * * * *